United States Patent
Rahman

(10) Patent No.: US 9,148,809 B2
(45) Date of Patent: Sep. 29, 2015

(54) EMPLOYING HANDOVER FAILURES FOR NETWORK FAULT PREDICTION OR REMEDY

(75) Inventor: Moshiur Rahman, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 754 days.

(21) Appl. No.: 12/577,899

(22) Filed: Oct. 13, 2009

(65) Prior Publication Data

US 2011/0086634 A1    Apr. 14, 2011

(51) Int. Cl.
- *H04W 24/08* (2009.01)
- *H04W 24/04* (2009.01)
- *H04W 36/00* (2009.01)

(52) U.S. Cl.
CPC ............ *H04W 24/08* (2013.01); *H04W 24/04* (2013.01); *H04W 36/00* (2013.01)

(58) Field of Classification Search
None
See application file for complete search history.

(56) References Cited

U.S. PATENT DOCUMENTS

| | | | |
|---|---|---|---|
| 6,353,902 B1 * | 3/2002 | Kulatunge et al. | 714/712 |
| 6,564,227 B2 * | 5/2003 | Sakakibara et al. | 1/1 |
| 7,080,294 B1 | 7/2006 | Weber et al. | |
| 8,280,381 B2 | 10/2012 | Zhu et al. | |
| 8,483,174 B2 | 7/2013 | Ahmavaara et al. | |
| 2002/0123365 A1 * | 9/2002 | Thorson et al. | 455/524 |
| 2003/0207687 A1 * | 11/2003 | Svedevall et al. | 455/436 |
| 2008/0162981 A1 * | 7/2008 | Jajoo et al. | 714/2 |
| 2008/0192697 A1 | 8/2008 | Shaheen et al. | |
| 2008/0227455 A1 * | 9/2008 | Kim | 455/436 |
| 2009/0149180 A1 * | 6/2009 | Kitazoe | 455/436 |
| 2009/0180451 A1 | 7/2009 | Alpert et al. | |
| 2010/0142367 A1 | 6/2010 | Zhang et al. | |
| 2010/0208681 A1 | 8/2010 | Elmaleh et al. | |
| 2010/0226267 A1 | 9/2010 | Jang et al. | |
| 2010/0267378 A1 | 10/2010 | Hamabe et al. | |
| 2011/0021154 A1 | 1/2011 | Marinier et al. | |
| 2011/0110225 A1 | 5/2011 | Mihaly et al. | |
| 2011/0188468 A1 | 8/2011 | Vikberg et al. | |
| 2011/0194427 A1 | 8/2011 | Shirota et al. | |
| 2012/0039299 A1 | 2/2012 | Teyeb et al. | |

FOREIGN PATENT DOCUMENTS

| | | | |
|---|---|---|---|
| WO | 2009084864 A1 | 7/2009 | |
| WO | 2010017961 A1 | 2/2010 | |

OTHER PUBLICATIONS

Office Action dated Sep. 21, 2012 for U.S. Appl. No. 12/855,435, 95 pages.
Notice of Allowance mailed dated Oct. 2, 2013 for U.S. Appl. No. 12/855,435, 22 pages.
Office Action dated May 20, 2014 for U.S. Appl. No. 14/147,221, 22 Pages.

* cited by examiner

*Primary Examiner* — Jackie Zuniga Abad
(74) *Attorney, Agent, or Firm* — Amin, Turocy & Watson, LLP

(57) ABSTRACT

The disclosed subject matter relates to an architecture that can detect a potential fault condition in a wireless communication network. In particular, the architecture can reference handover transaction failures in order to identify issues, e.g., before such issues escalate to more severe fault situations. In addition, the architecture can dynamically query a set of devices or components potentially responsible for the handover failure and/or take appropriate actions aimed at remedying the issue in an expeditious manner.

20 Claims, 12 Drawing Sheets

EMPLOYING HANDOVER FAILURES FOR NETWORK FAULT PREDICTION OR REMEDY

TECHNICAL FIELD

The present application relates generally to wireless communications networks, and more specifically to utilizing handover failures or analysis thereof in order to detect or prevent potential network faults of a more serious nature.

BACKGROUND

Conventional wireless networks typically provide for handover operations or transactions in which a mobile device switches from a first channel to a second channel. Handover transactions can occur for a variety of reasons, some of the more common of which are to enable the mobile device to maintain a call or data session even when traveling in and out of the effective ranges of cells or nodeBs; to enable interoperability of disparate network technologies; to allow more efficient sharing of network resources; to avoid interference, or to better suit behavior such as high travel speed or to enable required or desired features or services.

Regardless of the purpose or nature of the handover transaction, in some cases, handover transactions end in a failure for one reason or another. In many types of modern communication networks, such as, e.g., a Universal Mobile Telecommunications System (UMTS) Terrestrial Radio Access Network (UTRAN), a network fault can affect end-to-end signaling, such as control or user data flows, including handover transactions. Accordingly, conventional communications networks do not adequately leverage information that can be discovered from handover transactions.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The subject matter disclosed herein, in one aspect thereof, comprises an architecture that can examine handover failure information in order to detect a network error condition prior to such escalating to a more serious fault. In accordance therewith and to other related ends, the architecture can include a monitor component that can examine handover transaction messages received by a suitable network component such as a radio network controller (RNC). Furthermore, the monitor component can identify cases in which the handover associated with the handover transaction messages resulted in a failure.

In addition, the architecture can include an aggregation component that can store information associated with the handover failure (e.g., including the handover transaction message associated with a failed handover transaction as well as other pertinent information) to a data store. Moreover, the architecture can include a fault management component that can dynamically query components associated with the handover failure (e.g., components that are connected to the RNC or other network component) in order to determine a potential fault condition prior to escalation to a more severe situation.

The following description and the annexed drawings set forth in detail certain illustrative aspects of the disclosed subject matter. These aspects are indicative, however, of but a few of the various ways in which the principles of the disclosed subject matter may be employed and the disclosed subject matter is intended to include all such aspects and their equivalents. Other advantages and distinguishing features of the disclosed subject matter will become apparent from the following detailed description of the disclosed subject matter when considered in conjunction with the drawings.

DETAILED DESCRIPTION

Figure 1:
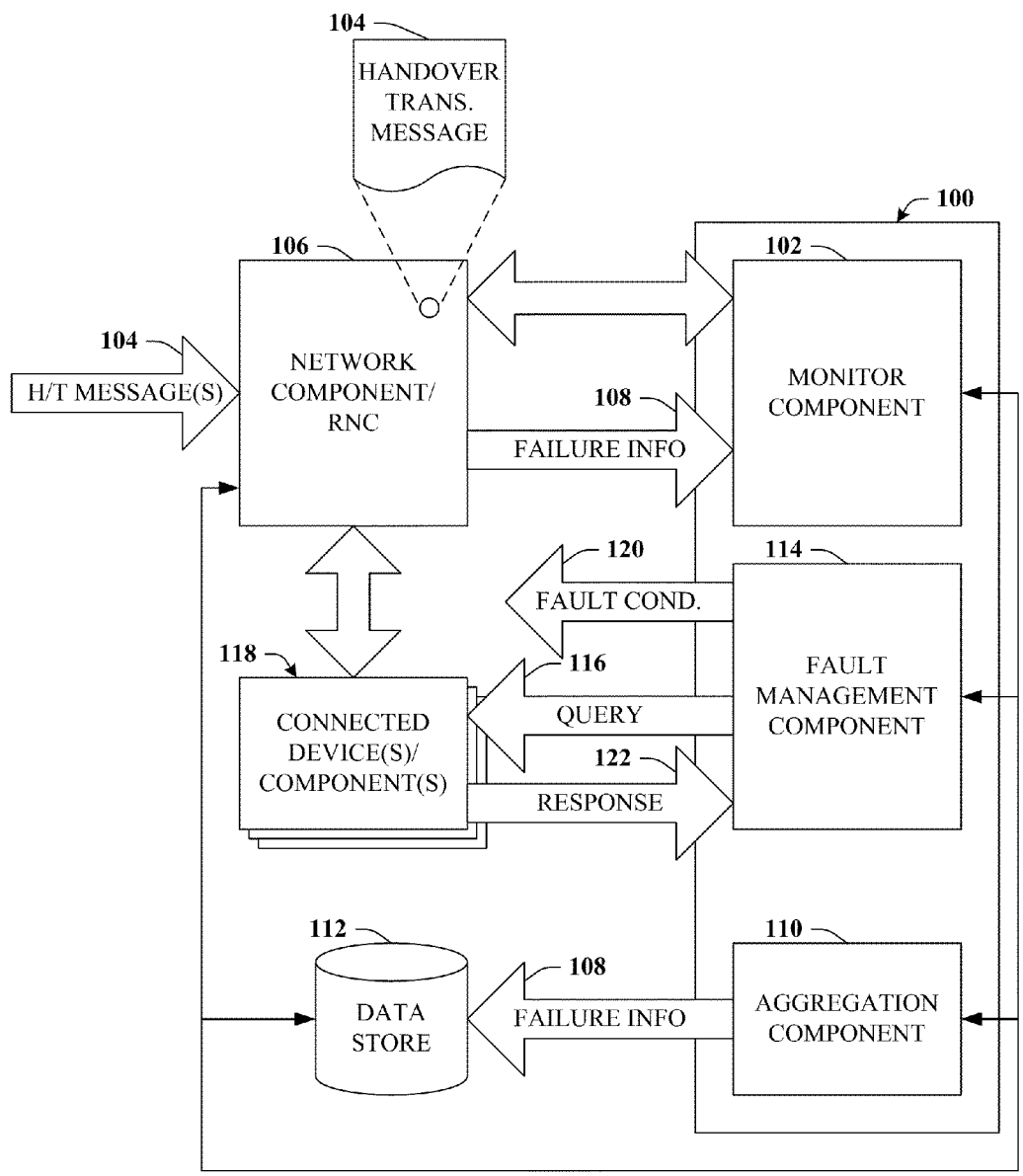
FIG. 1 is a block diagram of a system that can detect a potential fault condition in a wireless communication network based upon examination of handover failures.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, system 100 that can detect a potential fault condition in a wireless communication network based upon examination of handover failures is depicted. Generally, system 100 can include monitor component 102 that can examine a set of handover transaction messages, referred to herein either collectively or individually as handover transaction message(s) 104. Handover transaction messages 104 can be received by one or more network component 106, wherein network component 106 can be substantially any network device, equipment, or component that typically receives, logs, or has access to handover transaction messages 104.

Such handover transaction messages 104 can relate to a process or mechanism for transferring a call or data session for a mobile device or other user equipment (UE) from one channel to another channel, typically in connection with channels associated with a core network. In conventional wireless networks, handovers can occur for a variety of reasons. For example, a handover can be conducted during a call or data session when the UE moves between coverage areas for respective cells. Other examples can include switching from cells with overutilization and/or high capacity utilization to cells with lower utilization, to avoid interference, to enable interoperability of disparate network technologies, to better suit behavior such as high travel speed or required features or services, and so forth.

Regardless of the purpose or nature of the handover, in some cases, handover transactions fail, which is further discussed in connection with FIG. 3, infra. Such failures are typically described in the associated handover transactions message 104. Moreover, such failures can be an early indication for a more severe network fault if the source of the failure is not attended to or the issue remedied. Accordingly, as noted previously, monitor component 102 can examine handover transaction messages 104, and can further identify a handover failure. In one or more aspects, monitor component 102 can retrieve handover transaction message(s) 104 associated with a failed handover or substantially any other failure information 108.

In addition, system 100 can also include aggregation component 110 that can, inter alia, store information associated with handover failures, such as failure information 108, to data store 112 for subsequent access or recall. As used herein, data store 112 is intended to be a repository of all or portions of data, data sets, or information described herein or otherwise suitable for use with the described subject matter. Data store 112 can be centralized, either remotely or locally cached, or distributed, potentially across multiple devices and/or schemas. Furthermore, data store 112 can be embodied as substantially any type of memory, including but not limited to volatile or non-volatile, sequential access, structured access, or random access and so on. It should be understood that all or portions of data store 112 can be included in system 100, or can reside in part or entirely remotely from system 100.

Furthermore, system 100 can also include fault management component 114 that can dynamically query (e.g., by way of query 116) various components or devices such as connected devices/components 118. Connected components 118 can be connected to network component 106 and can constitute a set of components or devices that potentially can be in some way associated with the handover failure. Accordingly, upon transmitting one or more queries 116, fault management component 114 can receive responses 122 to queries 116. Based upon such responses 122, fault management component 114 can determine potential fault condition 120, e.g., prior to escalation to a more severe network fault. Queries 116 can vary in type or nature, as can the respective responses 122, which is further detailed with reference to FIG. 2.

Figure 2:
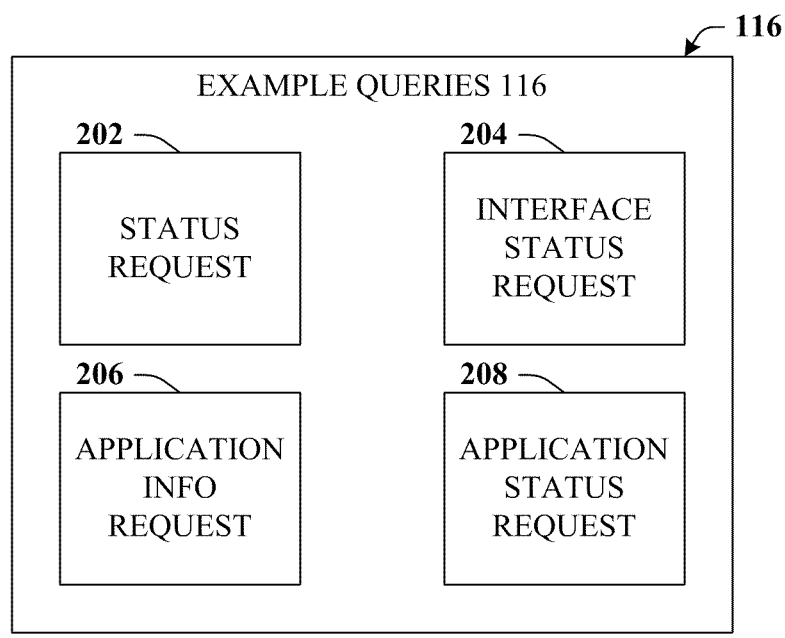
FIG. 2 provides a block diagram of various examples of queries.

While still referring to FIG. 1, but turning also to FIG. 2, various examples of queries 116 are illustrated. It should be appreciated that the examples provided herein are intended to be concrete illustrations; however, other examples can exist and can be employed in connection with the disclosed subject matter. A first example of query 116 can be a request for a status of connected component 118, which is depicted by status request 202. Typically, response 122 to status request 202 will indicate that the status is nominal, however, should response 122 indicate an error condition or the like, or not be received at all, fault management component 114 can be alerted to the situation, identify potential fault condition 120, and/or take further appropriate actions, some of which are further discussed in connection with FIG. 4.

Additionally or alternatively, example query 116 can be related to a request for a status of an interface between the connected component 118 and the network component 104, as illustrated by reference numeral 204; to a request for a type or number of applications running on connected component 118, as denoted by reference numeral 206; or to a request for a status of one or more applications running on connected component 118, for instance application status request 208. As with status request 202, requests 204-208 can also elicit suitable responses 122, which can be indicative of the source of the failed handover issue and/or for a potential fault condition. If all or a suitable portion of responses 122 to status requests 202-208 are nominal, then fault management component 114 can move on to the next connected component 118 and repeat the same or similar process of querying the next connected component 118. It should be understood, however, that in some cases fault management component 114 can transmit queries 116 to various connected components 118 in parallel as well.

Still referring to FIG. 1, it should be appreciated that while network component 106 can be substantially any network device, equipment, or component that typically receives or has access to handover transaction messages 104, in one or more aspect of the disclosed subject matter, network component 106 can be a Universal Mobile Telecommunications System (UMTS) Terrestrial Radio Access Network (UTRAN)-based Radio Network Controller (RNC), wherein the RNC receives handover transaction messages and manages handover operations for user equipment (UE) with respect to a source channel and a target channel.

A UTRAN RNC (e.g., network component 104 in this example case) can be particularly well-suited for the disclosed subject matter, given the additional control or operations and maintenance roles assigned to the RNC in third generation partnership project (3GPP) UMTS networks, which is much more vigorous when compared to base station controllers of the Global Systems for Mobile Communication (GSM) or the second generation specifications. For example, UMTS specifications point out the migration or evolutionary path from GSM circuit switched networks to packet switched technologies offering higher transmission rates. Based upon various service requirements of UTRAN networks, one responsibility allocated to the RNC is management of handover transactions.

RNCs generally form the interface between base stations or nodeBs and the core network. Accordingly, RNCs can be endowed with all the functionality implementations related to handovers as well as that for facilitating other tasks such as load control and open loop power control. During a handover transaction for a UE, the UE can occupy resources from at least two RNCs. For example, RNCs can fulfill two logical roles: drift and serving RNC. Accordingly, as discussed herein, the disclosed subject matter can detect, isolate, and/or facilitate remedy of potential faults in the host communication network by monitoring handoff message failures.

Thus, monitor component 102 can be included in or operatively coupled to the RNC 104 or to another network component(s) 104 that fulfill the role of receiving, logging, or handling handover transaction messages 104 or the capability to access handover transaction messages 104 or logs thereof. As noted previously, handover transactions can occur for a variety of reasons such as to support mobility or to enable interoperability of different network technologies (e.g., interoperability between third generation UMTS networks and second generation GSM networks), or the like. Moreover, handover transactions can occur in different varieties and failures associated with handover transactions can be due to various reasons. The above-mentioned features are further discussed in connection with FIG. 3.

Figure 3:
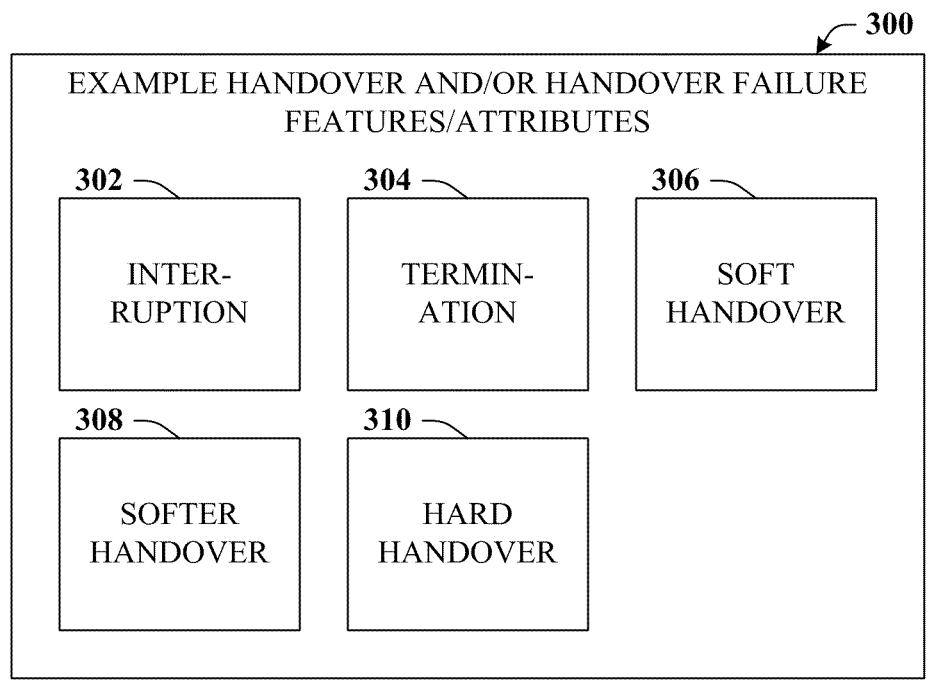
FIG. 3 illustrates a block diagram of that indicates various example handover and/or handover failure features or attributes.

While still referencing FIG. 1, but turning now also to FIG. 3, illustration 300 provides various example handover and/or handover failure features or attributes. Briefly, reference numerals 302 and 304 relate to conditions that cause or qualify as handover failures, which can be included in failure information 108. On the other hand, reference numerals 306-310 relate to various common types of handovers that occur in communication networks, which can also be included in failure information 108.

In one or more aspect of the disclosed subject matter, the handover failure can relate to an interruption of a call or a data session, which is exemplified by reference numeral 302. An interruption can relate to interference heard or detected on the UE end, can relate to reduced quality of service (QoS), or the like, and can be temporary while in some cases substantially unnoticeable at the UE. As another example, the handover failure can relate to an unintentional termination of a call or a data session, which is illustrated by reference numeral 304.

Furthermore, in one or more aspects of the disclosed subject matter, the handover transaction or a failure thereof can relate to soft handover 306 in which both a source channel and a target channel are maintained in parallel for a period during the handover. Additionally or alternatively, the handover or a failure thereof can relate to a softer handover in which a soft handover is maintained for both a forward link (e.g., downlink) and a reverse link (e.g., uplink) in connection with the call or data session. Moreover, in one or more aspect, the handover or a failure thereof can relate to a hard handover in which a source channel is released contemporaneously with connection to a target channel.

Continuing the discussion of FIG. 1, it should be appreciated that in many types of networks (e.g., a UTRAN network) a network fault can affect end-to-end signaling, control and user data flows, including handover transaction message 104 flows. Thus, it can be readily appreciated that by monitoring handover transaction messages 104, and in particular failures thereof, potential fault conditions 120 can be mitigated and/or preemptively handled prior to escalation to a more severe issue. In addition, by addressing issues or potential issues early, mean time to recovery (MTTR) can be improved or other recovery metrics relating equipment failure or repair. As another benefit, networks implementing the disclosed subject matter can differentiate themselves in the market in terms of customer satisfaction or QoS, and can therefore maintain a robust subscriber base.

As discussed supra, fault management component 114 can query 116 connected component 118 and, based upon responses 122 thereto, identify one or more potential fault condition 120. In order to accomplish these or other features, fault management component 114 can dynamically determine which components comprise the appropriate set of connected component 118. In one or more aspect, fault management component 114 can determine the appropriate set based upon a topology database or map indicating, e.g., which components are connected to network component/RNC 106. Thus, fault management component 114 can dynamically or automatically begin transmitting queries 116 to all or a portion of the set of connected components 118 in order to ascertain or identify potential fault condition 120. In particular, fault management component 114 can identify a faulty component included in the set of connected components 118 based upon an analysis of responses 122 to queries 116 or otherwise (e.g., when no response 122 is received). These and other features are further described in connection with FIG. 4.

Figure 4:
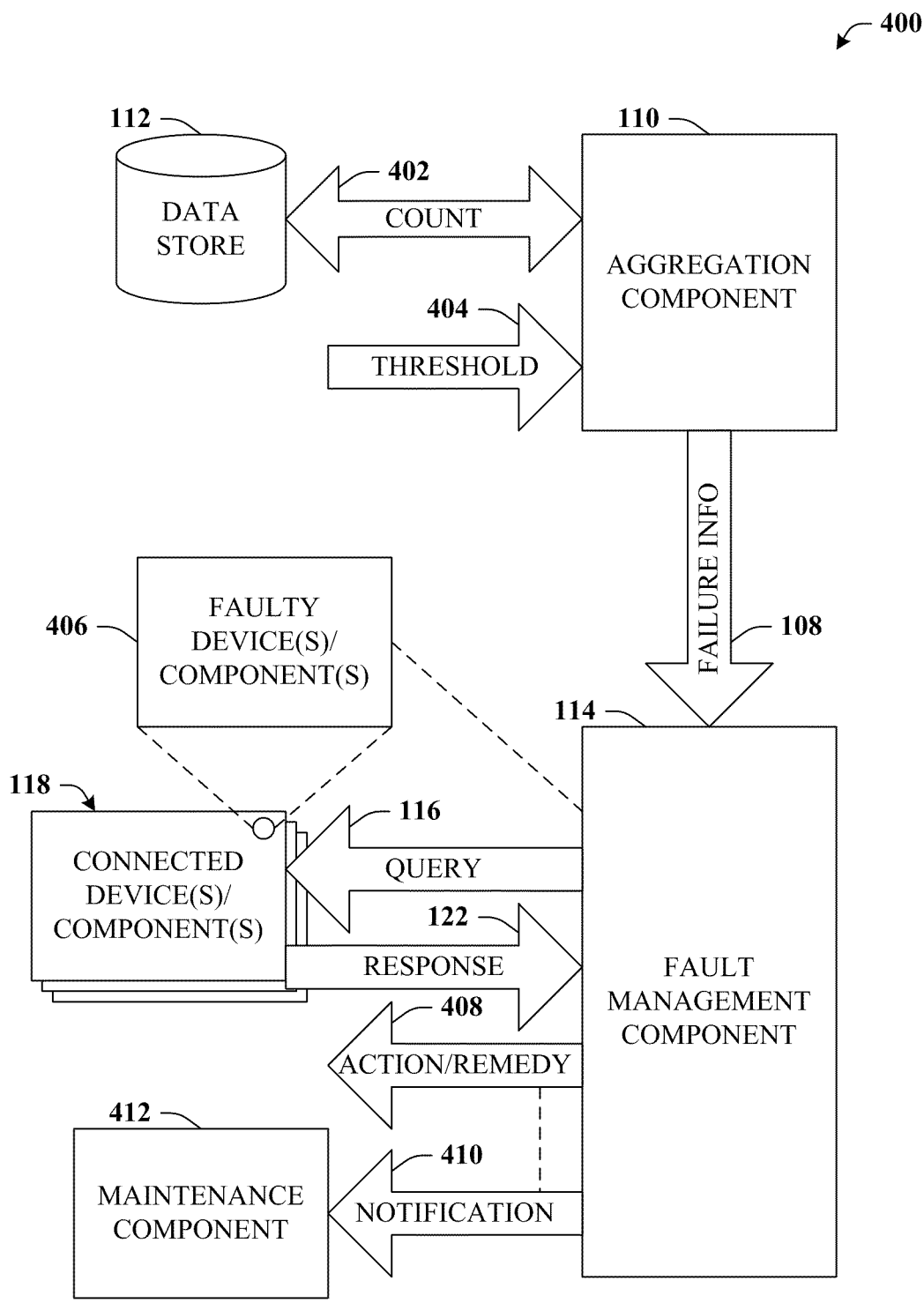
FIG. 4 is a block diagram of a system that illustrates additional aspects of features in connection with detecting or remedying a potential fault condition in a wireless communication network.

With reference now to FIG. 4, system 400 that illustrates additional aspects of features in connection with detecting or remedying a potential fault condition in a wireless communication network is provided. Generally, system 400 can include aggregation component 110 that can store information 108 associated with a handover failure; and fault management component 114 that can determine a potential fault condition 120 as substantially described supra.

In addition to what has been previously detailed, in one or more aspect of the disclosed subject matter, aggregation component 110 can further maintain count 402, wherein count 402 can relate to a number of handover failures identified by monitor component 102 and/or stored or registered to data store 112. Moreover, aggregation component 110 can compare count 402 to a predefined threshold (e.g., threshold 404) and notify fault management component 114 when count 402 meets or exceeds threshold 404.

Accordingly, not every indication of a handover failure need instigate the various activities of fault management component 114. Rather, while count 402 remains below threshold 404, then no further action need be taken. However, should count 402 meet or exceed threshold 404, then failure information 108 (which can include all or portions of failures associated with handover transaction message 104) can be provided to fault management component 114, wherein queries 116 can be transmitted, responses 122 received, faulty devices or components 406 identified, or potential fault conditions 120 determined. Appreciably, count 402 can be reset periodically, e.g., in order to track various periods. For example, threshold 404 can relate to a number of failures within, say 10 minutes or an hour. Accordingly, count 402 can therefore be reset every 10 minutes or every hour or another period.

In addition to identifying faulty component 406, fault management component 114 can also determine an appropriate action 408 in order to isolate or remedy potential fault condition 120. Appropriate action 408 can be determined based upon all available information such as the nature or type of faulty component 406, other available resources, network status, and so forth. In addition, appropriate action 408 and can be based upon probabilistic inferences or machine learning techniques, and can include automated actions such as resetting, reinitializing, or reconfiguring faulty device 406. Additionally or alternatively, appropriate action 408 can relate to notifying authorized entities or third parties. For example, appropriate action 408 can include a determination that fault management component 114 should facilitate transmission of notification 410 to, e.g., maintenance component 412, wherein notification 410 can include an identification of faulty component 406 as well as other suitable or pertinent information. Thus, maintenance component 412 (e.g., a troubleshooting platform, network, address, or entity) can choose how best to respond to potential fault condition 120.

Figure 5:
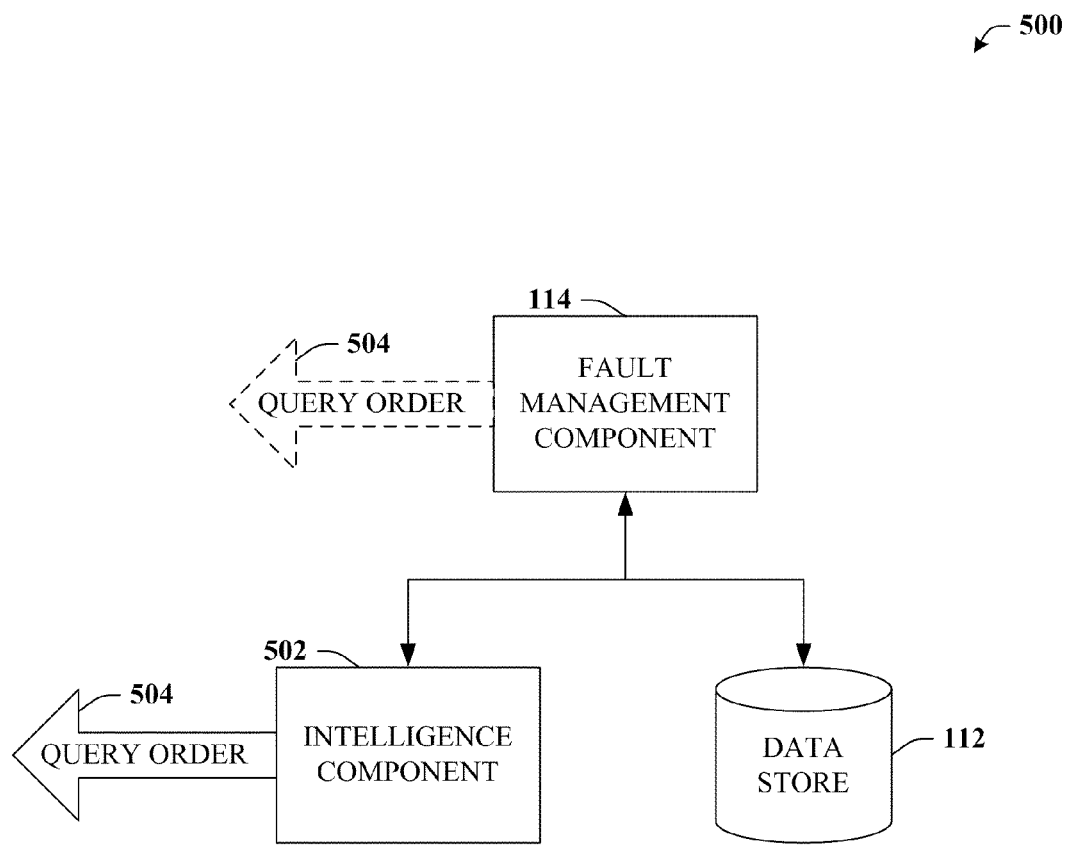
FIG. 5 illustrates a block diagram of a system that can perform or aid with various determinations or inferences.

Now turning to FIG. 5, system 500 that can perform or aid with various determinations or inferences is illustrated. Generally, system 500 can include fault management component 114 as well as other components described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences.

For instance, fault management component 114 can intelligently determine or infer either or both the identity of faulty component or device 406 based upon responses 122 from that device or whether additional information should be obtained from a connected component 118, and thus, the nature or type of request 116 to transmit. In addition, fault management component 114 can also intelligently determine or infer appropriate action 408 deemed most efficient or effective in remedying potential fault condition 120; or when or to whom to provide notifications 410 as well as what type of data to include in those notifications 410. As noted, such can be based upon historical analysis, probabilistic inferences or machine learning techniques.

In addition, system 500 can also include intelligence component 502 that can provide for or aid in various inferences or determinations. In particular, in accordance with or in addition to what has been described supra with respect to intelligent determinations or inferences provided by various components described herein, e.g., all or portions of fault management component 114. Additionally or alternatively, all or portions of intelligence component 502 can be included in one or more components described herein. Thus, intelligence component 502 can reside in whole or in part within system 100 or within components described herein. Moreover, intelligence component 602 will typically have access to all or portions of data sets described herein, such as data store 112.

In one or more aspect, either or both fault management component 114 or intelligence component 502 can determine query order 504, wherein query order 504 describes an order in which fault management component 114 queries connected component 118. Construction of query order 504 can be based upon other inferences or intelligent determinations, e.g., which component is more likely to be at fault and/or responsible for handover failures. Accordingly, queries 116 can be delivered in a particular order 504 intended to reduce time or costs in detecting potential fault condition 120.

In more detail, in order to provide for or aid in the numerous inferences described herein, intelligence component 502 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 6-10 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
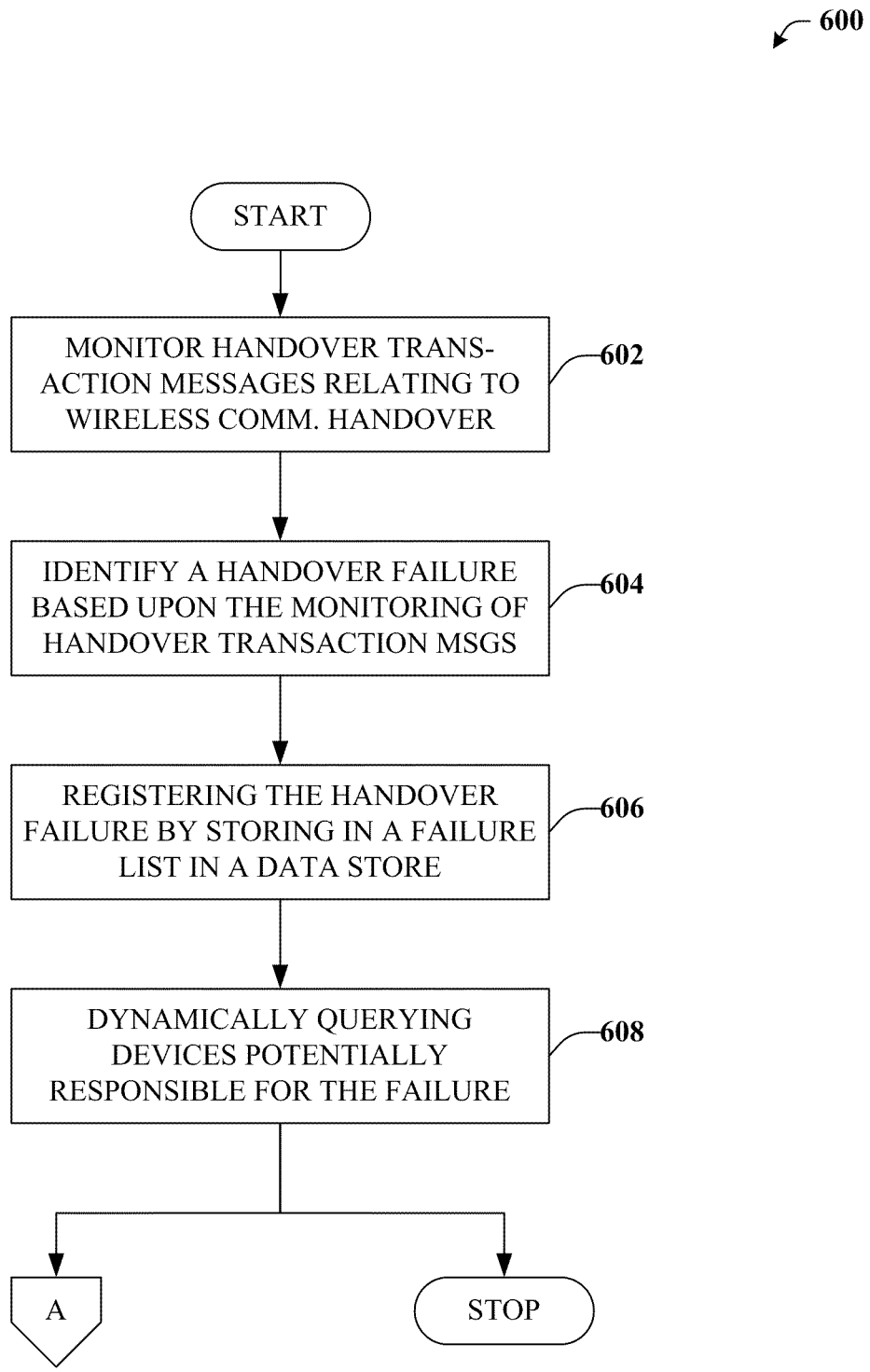
FIG. 6 depicts an exemplary flow chart of procedures defining a method for detecting an error condition before escalation to a fault in a wireless communication network.

Turning now to FIG. 6, exemplary method 600 for detecting an error condition before escalation to a fault in a wireless communication network is depicted. Generally, at reference numeral 602, handover transaction messages relating to wireless communication handover can be monitored. Handover transactions can relate to a process or mechanism for transferring a call or data session for a mobile device or other UE from one channel, typically associated with a core network, to another channel. Wireless network handovers can occur for a variety of reasons. For example, a handover can be conducted during a call or data session when the UE moves between coverage areas for respective cells. Other examples can include switching from cells with overutilization and/or high capacity utilization to cells with lower utilization, to avoid interference, to enable interoperability of disparate network technologies, to better suit behavior such as high travel speed or required features or services, and so forth.

Regardless of the type or nature of a handover operation, certain transactions result in a failure of some type. Accordingly, at reference numeral 604, a handover failure can be identified based upon the monitoring of handover transaction messages detailed in connection with reference numeral 602. When handover failures do occur, at reference numeral 606, the handover failure can be registered by, e.g., storing the handover transaction message that resulted in the handover failure or other related information to a data store. Furthermore, at reference numeral 608, components potentially responsible for the handover failure can be dynamically queried in order to isolate or remedy an error condition extant in the communication network.

Figure 7:
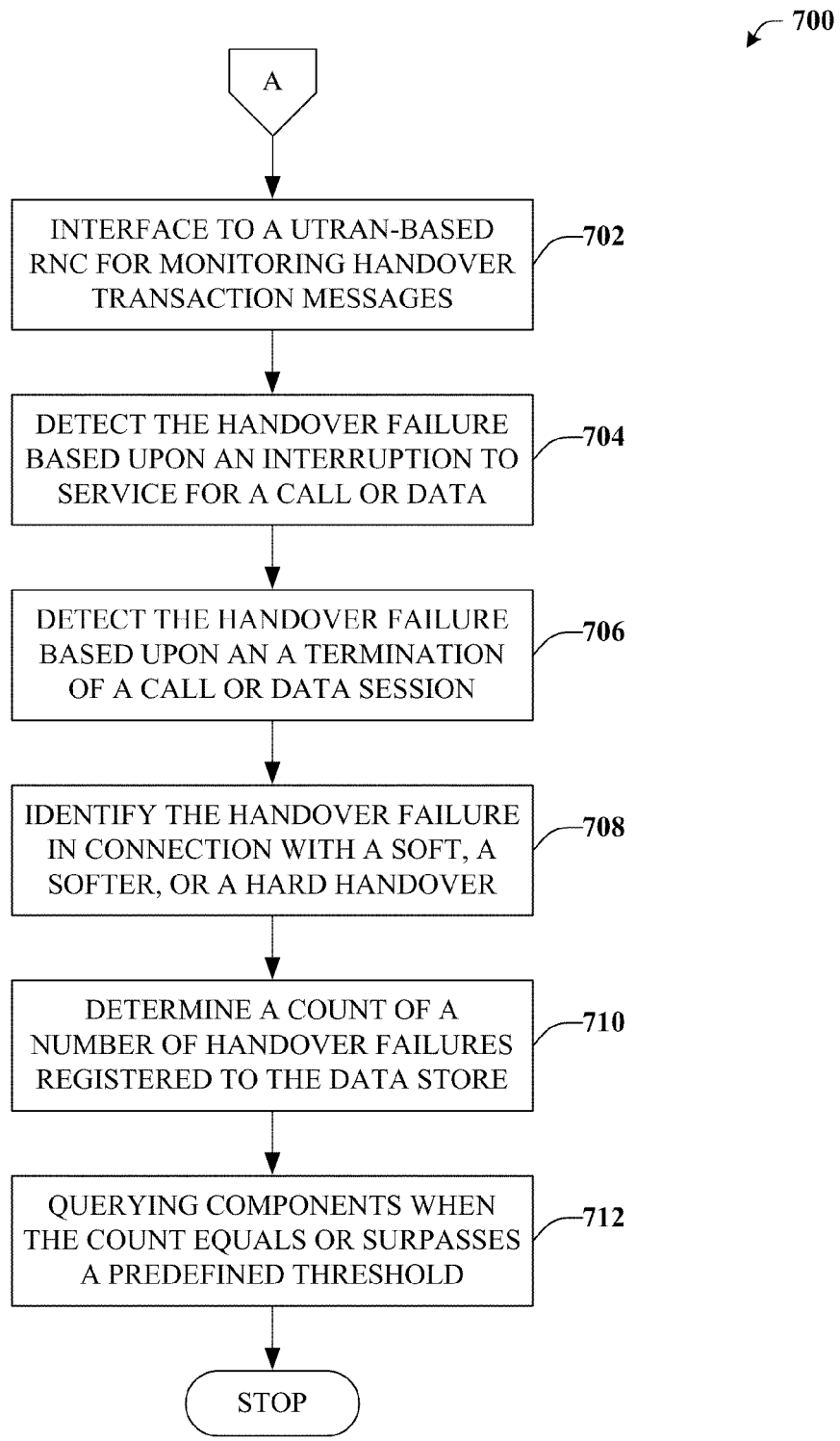
FIG. 7 is an exemplary flow chart of procedures that define a method for providing additional features or aspects in connection with detecting an error condition before escalation to a fault in a wireless communication network.

Turning now to FIG. 7, exemplary method 700 for providing additional features or aspects in connection with detecting an error condition before escalation to a fault in a wireless communication network is illustrated. At reference numeral 702, a UTRAN-based RNC can be interfaced to for monitoring handover message transactions. For example, the monitoring and/or identifying features discussed in connection with reference numerals 602 and 604, respectively of FIG. 6 can be performed at or by interfacing to a UTRAN RNC.

Next to be described, at reference numeral 704, the handover failure identified in connection with reference numeral 604 can be detected based upon an interruption to service for a call or data session. Additionally or alternatively, at reference numeral 706, the handover failure can be detected based upon an unintentional termination (e.g., a dropped call) of a call or data session. Appreciably, as indicated at reference numeral 708, the handover failure can be identified in connection with at least one of a soft handover, a softer handover, or a hard handover.

Moreover, at reference numeral 710, a count of a number of handover failures registered to the data store, e.g., in a given period, can be determined. Thus, at reference numeral 712, the querying of components potentially responsible for the handover failure discussed in connection with reference numeral 608 can be initialized or activated when the count equals or surpassed the predefined threshold.

Figure 8:
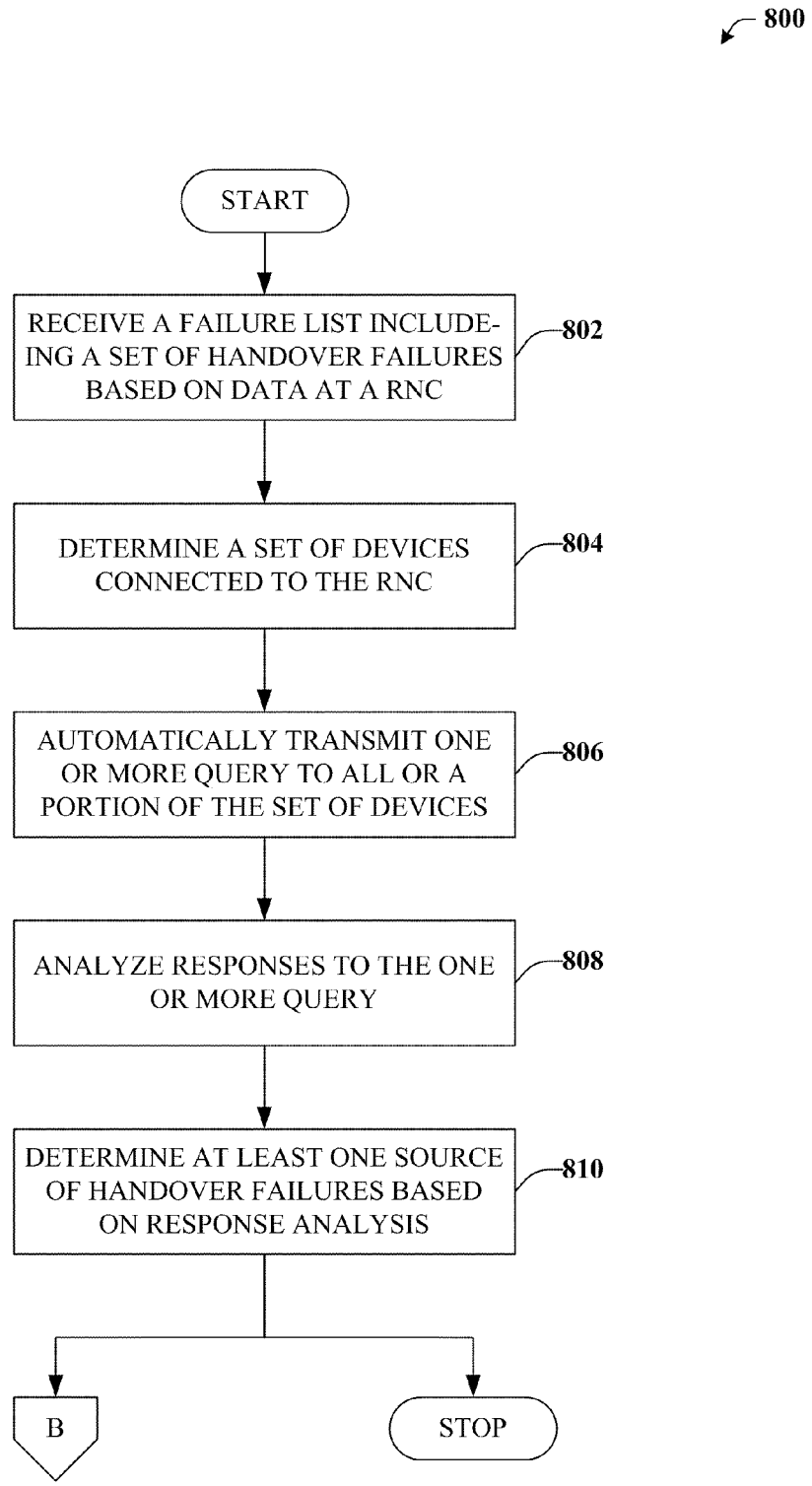
FIG. 8 is an exemplary flow chart of procedures that define a method for dynamically querying components potentially responsible for a handover failure in a UTRAN-based communication network.

With reference now FIG. 8, exemplary method 800 for dynamically querying components potentially responsible for a handover failure in a UTRAN-based communication network is provided. In general, at reference numeral 802, a failure list including a set of handover failures detected based upon data received by a RNC can be obtained or received.

At reference numeral 804, a set of devices connected to the RNC can be identified and/or determined. Accordingly, the set of device is relatively certain to include a device responsible for the handover failures, and a likely candidate for a potential network fault. Furthermore, at reference numeral 806, one or more query can be automatically transmitted to all or a portion of the set of devices connected to the RNC.

Next to be described, at reference numeral 808, responses to the one or more query transmitted in connection with reference numeral 806 can be analyzed, e.g., analyzed for identifying a likely culprit for handover failures and/or for a capacity or potential to contribute to a more severe network fault. Hence, at reference numeral 810, at least one source (e.g., a device included in the set of devices) of the set of handover failures can be determined based upon the analyzing conducted in connection with reference numeral 808.

Figure 9:
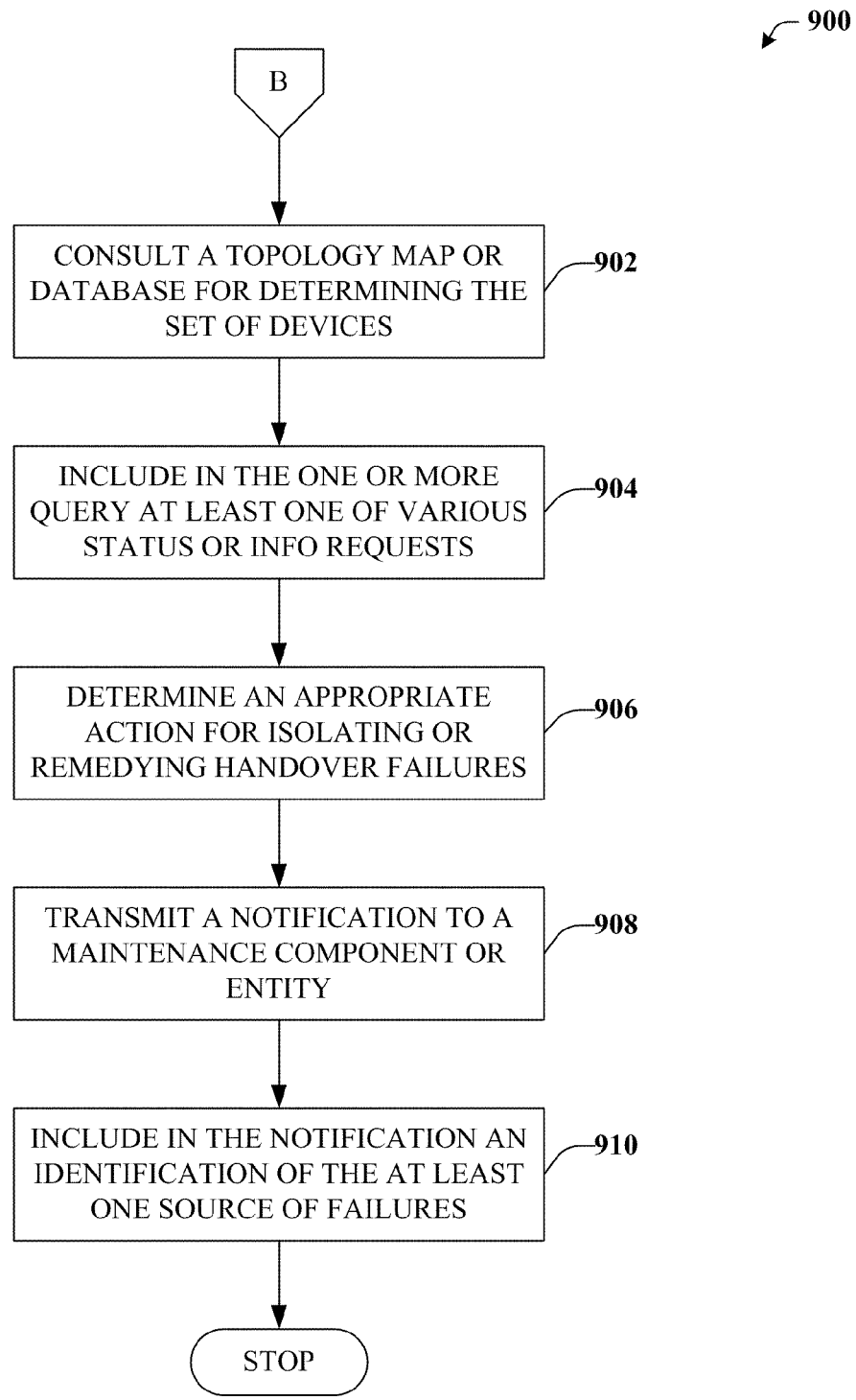
FIG. 9 depicts an exemplary flow chart of procedures defining a method for providing various addition features or aspects in connection with dynamically querying components potentially responsible for a handover failure in a UTRAN-based communication network.

Turning briefly now to FIG. 9, exemplary method 900 for providing various addition features or aspects in connection with dynamically querying components potentially responsible for a handover failure in a UTRAN-based communication network is depicted. For example, at reference numeral 902, a topology database can be consulted in connection with determining a set of devices connected to the RNC as provided for at reference numeral 804. Likewise, at reference numeral 904, in connection with reference numeral 806 in which one or more query can be automatically transmitted, these one or more queries can include, e.g., a request for a status of a device connected to the RNC, a request for a status of an interface between the device and the RNC, a request for a type and number of applications running on the device, or a request for a status of one or more applications running on the device.

Similarly, at reference numeral 906, an appropriate action can be determined in order to isolate or remedy the at least one source of the set of handover failures. For example, a command to reset or reinitialize can be delivered to the device responsible for the handover failures. As another example, at reference numeral 908, a notification can be transmitted to a maintenance component or entity. Appreciably, at reference numeral 910, an identification of the at least one source of the set of handover failures can be included in the notification.

Figure 10:
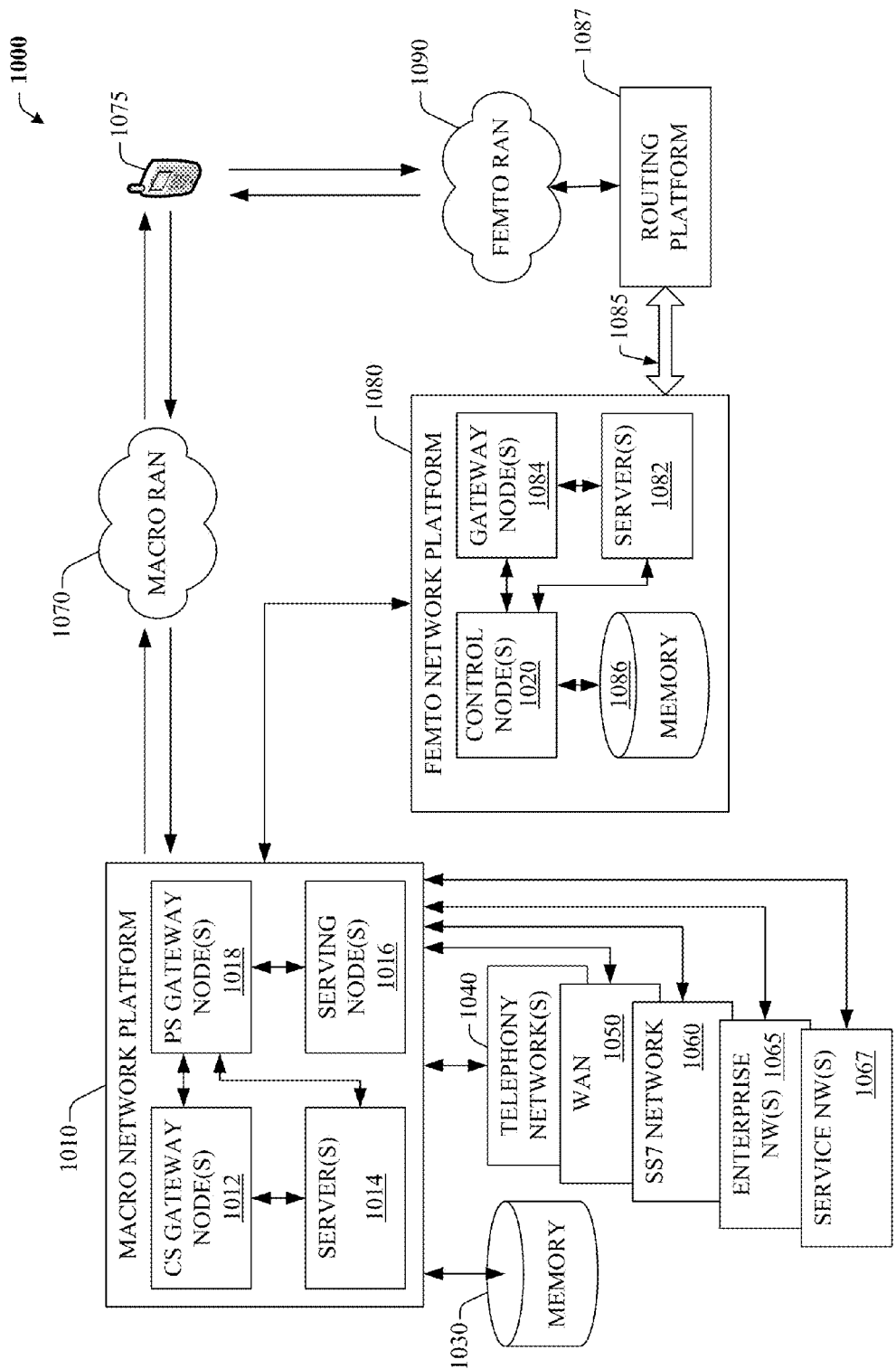
FIG. 10 illustrates an example wireless communication environment with associated components that can enable operation of an enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
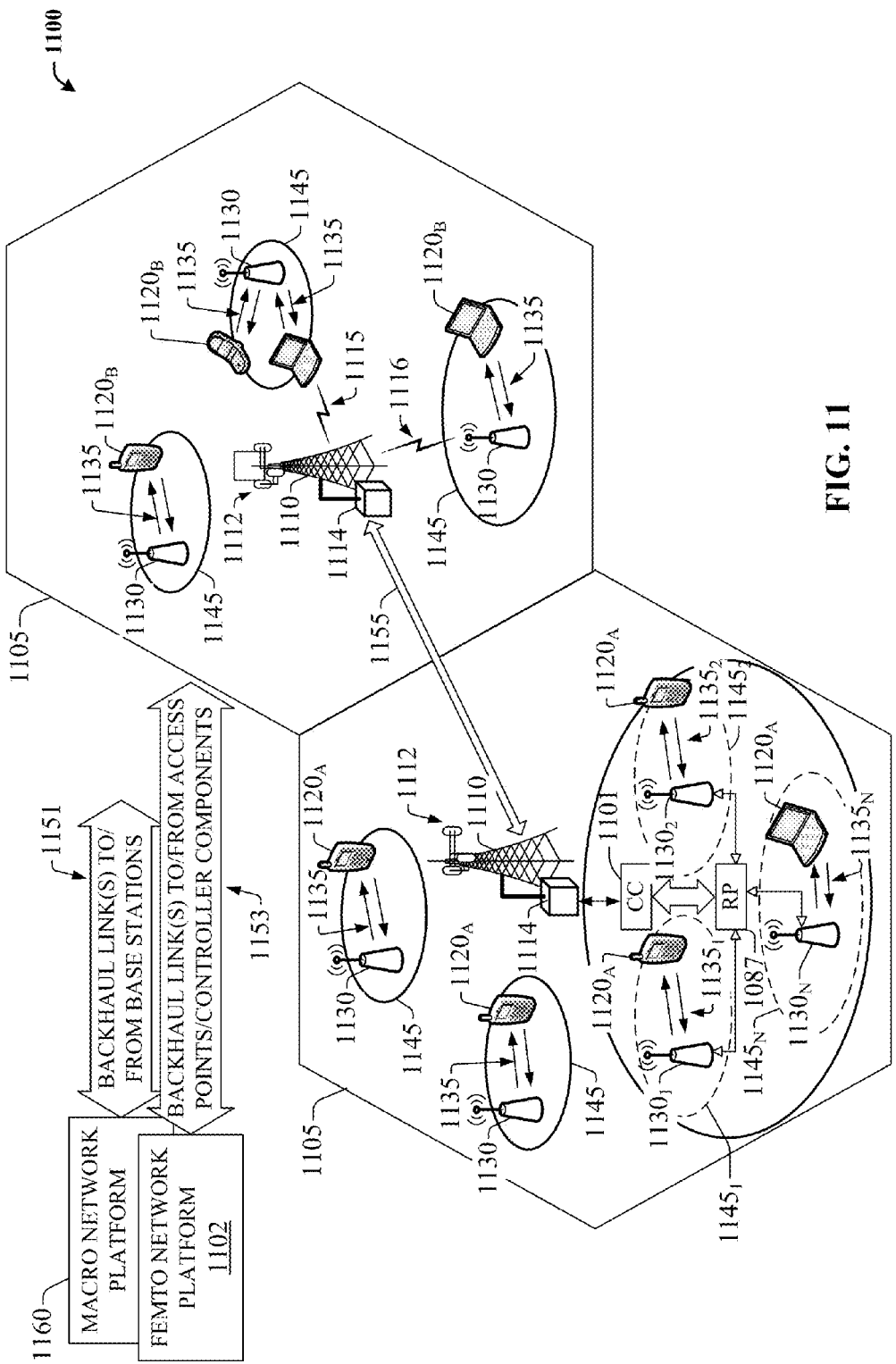
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage; each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE $1120_A$, $1120_B$ in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE $1120_A$, $1120_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs 1120$_A$ can be routed by the RP 102, for example, internally, to another UE 1120$_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points 1130$_1$-3730$_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE 3720$_A$ connected to femto APs 1130$_1$-3830$_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
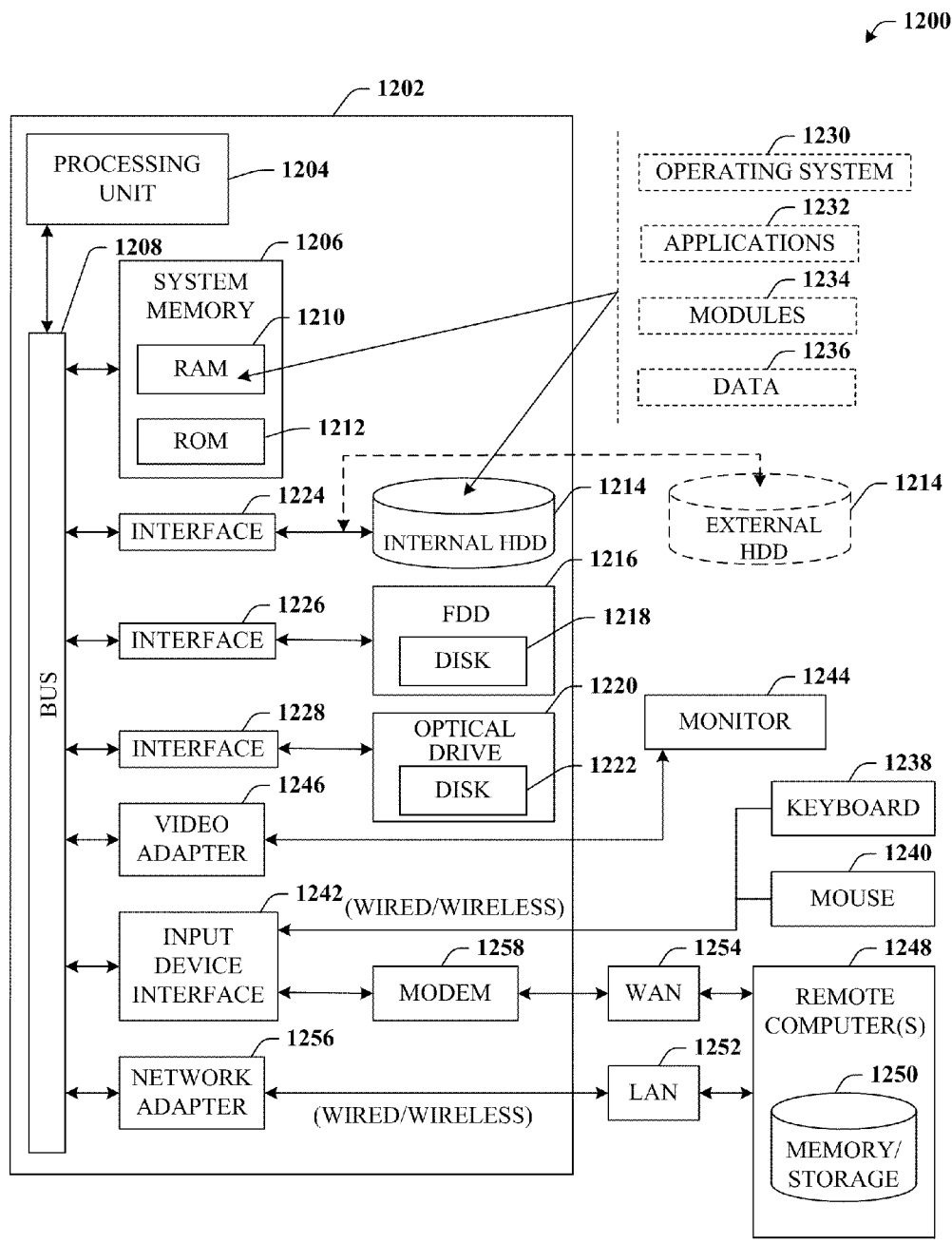
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
    a memory to store instructions; and
    a processor, communicatively coupled to the memory, that facilitates execution of the instructions to perform operations, comprising:
    determining, from handover transaction messages received from network equipment, a handover failure associated with a handover that transfers a communication path for a user equipment from a first network access point to a second network access point that differs from the first network access point;
    determining a first fault condition associated with the handover failure in response to comparing a count of a first number of instances of the handover failure to a first defined threshold;
    storing information associated with the handover failure; querying network devices involved with the handover failure; receiving results data based on responses to the querying;
    predicting, based on the results data, a second fault condition representing an escalation of the first fault condition associated with the handover failure;
    determining a respective count of a second number of instances of the handover failure associated with different devices of the network devices involved with the handover failure and comparing the respective count to a second defined threshold; and
    providing a notification in response to the respective count being determined to exceed the second defined threshold.

2. The system of claim 1, wherein the network equipment is a universal mobile telecommunications system terrestrial radio access network-based radio network controller that manages handover operations for user equipment.

3. The system of claim 1, wherein the operations further comprise identifying a set of devices connected to the network equipment that are involved with the handover failure.

4. The system of claim 3, wherein the querying network devices comprises querying at least a subset of the set of devices.

5. The system of claim 4, wherein the operations further comprise transmitting a query to a component of the set of devices that comprises at least one of a first request for a first status of the component, a second request for a second status of an interface between the component and the network equipment, a third request for a type and a number of applications executing on the component, or a fourth request for a third status of an application executing on the component.

6. The system of claim 4, wherein the operations further comprise identifying a faulty device from among the set of devices based upon an analysis of the responses to the querying.

7. The system of claim 1, wherein the handover failure relates to an interruption of a voice communication session or a data communication session.

8. The system of claim 1, wherein the handover failure relates to an unintentional termination of a voice communication session or a data communication session.

9. The system of claim 1, wherein the handover failure relates to a handover in which a source channel for the handover and a target channel for the handover are maintained in parallel for a period during the handover.

10. The system of claim 1, wherein the handover failure relates to a handover in which a source channel for the handover and a target channel for the handover are maintained in parallel for a period during the handover and in which the handover is maintained for a forward link and a reverse link in connection with a voice communication session or a data communication session.

11. The system of claim 1, wherein the handover failure relates to a handover in which a source channel for the handover is released concurrently with a connection to a target channel for the handover.

12. The system of claim 1, wherein the operations further comprise determining an action to remedy the second fault condition.

13. The system of claim 1, wherein the operations further comprise transmitting a second notification, wherein the notification comprises an identification of the second fault condition.

14. The system of claim 1, wherein the operations further comprise determining an order to query network devices based on a determination of which network component has caused the handover failure.

15. A method, comprising:
monitoring, by a system comprising a processor, handover transaction messages relating to a wireless communication handover that transfers a communication path for a user equipment from a first network access point to a second network access point that differs from the first network access point;
identifying, by the system, a handover failure based on the monitoring of the handover transaction messages;
registering, by the system, the handover failure by storing the handover failure in a failure data structure in a data store;
determining, by the system, a first count of a first number of instances of the handover failure registered to the data store surpasses a first defined threshold;
determining a second count of a second number of instances of the handover failure registered to the data store and associated with different devices of network devices determined to be potentially responsible for the handover failure;
in response to determining the second count surpasses the second defined threshold, transmitting a notification indicative of the second count surpassing the second defined threshold;
querying, by the system, components of a the network devices determined to be potentially responsible for the handover failure;
identifying, by the system, a first error condition associated with the handover failure based on responses to the querying; and
predicting, by the system, a second error condition associated with a potential fault in the network representing an escalation of the first error condition determined to be potentially responsible for the handover failure.

16. The method of claim 15, wherein the querying the network devices determined to be potentially responsible for the handover failure comprises transmitting, by the system, a first request for a first status of a device of the network devices, a second request for a second status of an interface between the device and other network equipment, a third request for a type and a number of applications executing on the device, or a fourth request for a third status of an application executing on the device.

17. The method of claim 15, wherein the operations further comprises determining, by the system, the network devices potentially responsible for the handover failure based on map data representing a topological map of the network devices.

18. A method, comprising:
receiving, by a system comprising a processor, a failure data structure including information associated with a set of handover failures detected from data received from a radio network controller, wherein the set of handover failures correspond to a failure in connection with transferring a communication path for a user equipment from a first network access point to a different network access point;
determining a first count of the set of handover failures and a second count of the set of handover failures associated with different devices of network devices involved with the set of handover failures;
determining the first count exceeds a first defined threshold and the second count exceeds a second defined threshold;
providing a notification in response to the second count exceeding the second defined threshold;
determining, by the system, a set of devices connected to the radio network controller;
transmitting, by the system, a query to a subset of the set of devices connected to the radio network controller;
analyzing, by the system, a response to the query; and
determining, by the system, a first fault condition representing a source of the set of handover failures based upon the analyzing; and
predicting a second fault condition representing an increase of a severity of the first fault condition associated with the source of the set of handover failures.

19. The method of claim 18, further comprising:
accessing, by the system, a topology data store to determine the set of devices connected to the radio network controller; and
determining, by the system, an action to identify the source of the set of handover failures.

20. The method of claim 18, wherein the transmitting the query comprises transmitting, by the system, a first request for a first status of a device of the network devices, a second request for a second status of an interface between the device and the radio network controller, a third request for a type and a number of applications executing on the device, or a fourth request for a third status of an application executing on the device.

* * * * *